United States Patent Office 2,720,533
Patented Oct. 11, 1955

2,720,533

AMINO-FLUORANTHRAQUINONES AND PROCESS OF MAKING SAME

Walter Jenny, Reinach, and Walter Kern, Sissach, Switzerland, assignors to Ciba Limited, Basel, Switzerland, a Swiss firm No Drawing. Application July 30, 1951,
Serial No. 239,402

Claims priority, application Switzerland July 31, 1950

2 Claims. (Cl. 260—381)

1-amino-6-chloranthraquinone is a known compound which can be prepared by replacing the sulfonic acid group in 1-nitro-anthraquinone-6-sulfonic acid by a chlorine atom by means of sodium chlorate, and reducing the nitro group in the resulting 1-nitro-6-chloranthraquinone. However, it is not possible to prepare 1-amino-6-bromanthraquinone in an analogous manner because the sulfonic acid group in the $\beta$-position scarcely reacts at all with an alkali bromate. The possibility of preparing 1-amino-6-fluoranthraquinone in an analogous manner from 1-nitro-anthraquinone-6-sulfonic acid by way of 1-nitro-6-fluoranthraquinone is ruled out, in view of the fact, as is known, that with the agents available at the present time it is not possible to exchange a sulfonic acid group for a fluorine atom.

An alternative method for preparing 1-amino-6-chloranthraquinone consists in treating sodium 6-chloranthraquinone-1-sulfonate in the presence of sodium nitrobenzene-3-sulfonate with aqueous ammonia at a temperature below 160° C. (see U. S. Patent No. 2,100,527 of November 30, 1937 to Myron S. Whelen). By this method 1-amino-6-bromanthraquinone can also be made from sodium 6-bromanthraquinone-1-sulfonate. If however the treatment with ammonia is carried out at temperatures above 170° C., 1:6-diaminoanthraquinone is obtained directly from sodium 6-chloranthraquinone-1-sulfonate as well as from sodium 6-bromanthraquinone-1-sulfonate, and the same diamino compound is also obtained when ammonia is reacted in the foregoing manner at a temperature above 170° C. with 1-amino-6-chlor- or -6-bromanthraquinone.

Attempts to prepare 1-amino-6-fluoranthraquinone from 2-fluoranthraquinone-5-sulfonic acid by the methods described above fail, because at temperatures substantially below 170° C., for example, those at which the reaction of 6-chlor- or 6-bromanthraquinone-1-sulfonic acid to form 6-brom- or 6-chlor-1-aminoanthraquinone occurs, as given in the aforesaid U. S. patent, 2-fluoranthraquinone-5-sulfonic acid is unexpectedly converted with ease into 1:6-diaminoanthraquinone. In this case therefore the fluorine atom is unexpectedly more mobile than the chlorine or bromine atom.

The present invention provides a process whereby 1-amino-6-fluoranthraquinone, which is not obtainable by the more obvious methods referred to above, can be obtained in a simple manner. The process of the invention comprises sulfonating 2-fluoranthraquinone in the presence of a mercury salt, treating the resulting mixture of 6- and 7-fluoranthraquinone-1-sulfonic acid or the 6-fluoranthraquinone-1-sulfonic acid isolated therefrom with an alkali chlorate, condensing the resulting chlorofluoranthraquinone or isomeric mixture with an aromatic sulfonamide and hydrolysing the resulting aryl sulfonyl amino-fluoranthraquinone or isomeric mixture.

The sulfonation of the 2-fluoranthraquinone in the presence of a mercury salt may be carried out with advantage by means of fuming sulfuric acid (oleum) at a raised temperature, for example at a temperature ranging from 50–150° C. The sulfonic acid group enters the 5-position of the anthraquinone nucleus and partly also the 8-position, so that the sulfonation mixture contains 6-fluoranthraquinone-1-sulfonic acid (about 55 per cent at least) and 7-fluoranthraquinone-1-sulfonic acid (up to about 45 per cent.). Depending on whether 6-fluoranthraquinone-1-sulfonic acid free from isomer is desired or whether a smaller or larger amount of 7-fluoranthraquinone-1-sulfonic acid is permissible or desired as a by-product (for example in order to utilize as much as possible of the reacted 2-fluoranthraquinone in cases where the isomeric mixture is equally suitable for the purpose in view), the sulfonation product may be more or less completely separated from the reaction mixture, which is advantageously previously diluted with water, by conversion into the alkali salt sparingly soluble in dilute acid, for example, the sodium salt.

Replacement of the sulfonic acid group by a chlorine atom by means of an alkali chlorate such as potassium or sodium chlorate is carried out by a method in itself known, advantageously in an aqueous medium containing hydrochloric acid at a raised temperature, advantageously at 80–100° C.

The reaction of the resulting chloro-fluoranthraquinone with the aromatic sulfonamide, for which purpose a simple sulfonamide such, for example, as para-toluene sulfonamide may be used, may also be carried out by methods in themselves known, for example, by heating the two reactants together in the presence of sodium acetate and copper acetate. The hydrolysis of the resulting arylsulfonylamino compounds to the amines is advantageously carried out by gently heating in concentrated sulfuric acid.

The invention also includes a process for the manufacture of 1-chloro-6-fluoranthraquinone or a mixture of it with 1-chloro-7-fluoranthraquinone, respectively, wherein 2-fluoranthraquinone is sulfonated in the presence of a mercury salt, and the resulting mixture of 6- and 7-fluoranthraquinone-1-sulfonic acid or the 6-fluoranthraquinone-1-sulfonic acid isolated therefrom is treated with an alkali chlorate.

1-amino-6-fluoranthraquinone, obtainable by the process of the invention, which may also contain some 1-amino-7-fluoranthraquinone and also 1-chloro-6-fluoranthraquinone or 1-chloro-6-fluoranthraquinone containing some of the 1:7-isomer, are new and valuable intermediate products which are especially suitable for the manufacture of anthraquinone vat dyestuffs. Dyestuffs of this kind are disclosed in our copending application, Ser. No. 239,401, Patent No. 2,685,591 filed on even date herewith.

The following examples illustrate the invention, the parts and percentages being by weight:

Example 1

93 parts of pure 2-fluoranthraquinone are introduced into a mixture of 192 parts of oleum, containing 24 per cent. of free $SO_3$, 34 parts of oleum containing 65 per cent. of free $SO_3$, and 2 parts of mercury sulfate at 60–65° C., while stirring. The temperature is then raised to 125° C. in the course of 1 hour, and maintained at 125–130° C. until the sulfonation is complete. The whole is then poured into 3000 parts of warm water, which contains 2 parts of sodium chlorate, and the mixture is heated to the boil and filtered with suction. The filtrate is mixed hot with about 50 parts of sodium carbonate, and allowed to stand at room temperature for 24 hours. The fluoranthraquinone sulfonic acid precipitated in the form of colorless crystals is separated by filtering with suction, and washed with saturated sodium sulfate solution, and dried.

A solution of 130 parts of sodium chlorate in 330 parts of water is introduced dropwise into a solution of 37 parts of the resulting sodium 2-fluoranthraquinone-5-sulfonate in 3000 parts of water and 240 parts of concentrated hydrochloric acid in the course of 2 hours at 90–95° C., while stirring. Stirring is continued at 90–95° C. until no further chloro-derivative precipitates. The whole is then filtered hot, and washed with boiling water and dried. The crude 1-chlor-6-fluoranthraquinone can easily be recrystallized from glacial acetic acid, chlorobenzene or ortho-dichlorobenzene. It crystallizes in pale yellow needles and dissolves in concentrated sulfuric acid with an intense yellow coloration.

*Analysis.*—$C_{14}H_6O_2ClF$: Chlorine (calculated) 13.62%; Fluorine (calculated) 7.29%; Chlorine (found) 13.65%; Fluorine (found) 7.4%. Practically pure 1-chloro-6-fluoranthraquinone melts at 191–192° C.

A mixture of 200 parts of 1-chloro-6-fluoranthraquinone, 160 parts of para-toluene sulfonamide, 80 parts of anhydrous sodium acetate, 4 parts of copper acetate and 1400 parts of nitrobenzene is slowly heated up to 170° C. The mixture is then stirred at 170–175° C. for 2 hours and then for a further 2 hours at 190–195° C. After cooling, the whole is filtered with suction, and the filter residue is washed well with boiling alcohol and water and dried. The resulting sulfonamide derivative crystallizes from anisole in the form of yellow crystals melting at 259° C.

14 parts of the sulfonamide compound are stirred with 180 parts of concentrated sulfuric acid for 40 minutes at 60–65° C. After pouring the solution into ice water, the whole is filtered with suction, and the filter residue is washed neutral with water and dried. The resulting red powder can be recrystallized from chlorobenzene or anisole, and then forms brilliant red needles, which dissolve with a yellow coloration in concentrated sulfuric acid. The practically pure 1-amino-6-fluoranthraquinone so obtained corresponds to the formula

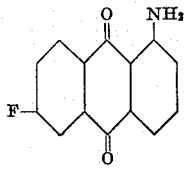

and melts at 208–209° C.

*Example 2*

The dilute reaction mixture obtained by the sulfonation of 2-fluoranthraquinone as described in Example 1 is mixed with more than 50 parts of sodium carbonate, for example, about 100 or 150 parts, and there is obtained a mixture of fluoranthraquinone sulfonic acids, which apparently contains a considerable amount of the 7-isomer. By the action of chlorate upon the hydrochloric acid solution of this sulfonic acid mixture a mixture of chlorofluoranthraquinone is obtained, which melts at a markedly lower temperature than the pure 1-chloro-6-fluoranthraquinone. This mixture of chloro-fluoranthraquinones can be converted by the method described in Example 1 into a mixture of amino-fluoranthraquinones. The resulting mixture is also a valuable intermediate product for the manufacture of dyestuffs.

What we claim is:

1. A process for the manufacture of an α-amino-β-fluoranthraquinone, the amino group and fluorine atom of which are bound to different six-membered rings of the anthraquinone nucleus, which process comprises sulfonating in the presence of a mercury salt 2-fluor-anthraquinone, treating the resulting β-fluoranthraquinone-α-sulfonic acid with an alkali chlorate, condensing with an aromatic sulfonamide the resulting α-chloro-β-fluoranthraquinone, and hydrolysing the so obtained α-aryl sulfonyl amino-β-fluoranthraquinone.

2. A process for the manufacture of an α-amino-β-fluoranthraquinone, which comprises sulfonating in the presence of a mercury salt 2-fluor-anthraquinone, isolating substantially from the resulting mixture of 6- and 7-fluoranthraquinone-1-sulfonic acid the 6-fluor-anthraquinone-1-sulfonic acid by converting the sulfonic acids in an aqueous medium into alkali salts and separating from the resultant mixture the precipitated 6-fluor-anthraquinone-1-sulfonic acid and treating it with an alkali chlorate, condensing with an aromatic sulfonamide the resulting 1-chlor-6-fluoranthraquinone, and hydrolysing the so obtained 1-arylsulfonylamino-6-fluoranthraquinone.

References Cited in the file of this patent

UNITED STATES PATENTS

| Number | Name | Date |
|---|---|---|
| 743,664 | Schmidt | Nov. 10, 1903 |
| 1,761,620 | Deinet | June 3, 1930 |
| 1,810,011 | Gubelmann et al. | June 16, 1931 |
| 1,924,664 | Thomson et al. | Aug. 29, 1933 |
| 2,013,657 | Johnson | Sept. 10, 1935 |
| 2,074,306 | Whelen | Mar. 16, 1937 |
| 2,100,527 | Whelen | Nov. 30, 1937 |
| 2,134,654 | Lulek | Oct. 25, 1938 |
| 2,181,034 | Whelen | Nov. 21, 1939 |